(12) United States Patent
Kark et al.

(10) Patent No.: US 7,634,708 B2
(45) Date of Patent: Dec. 15, 2009

(54) RELOCATABLE STORAGE PROTECT KEYS FOR SYSTEM MAIN MEMORY

(75) Inventors: Kevin W. Kark, Poughkeepsie, NY (US); Liyong Wang, Wappingers Falls, NY (US); Carl B. Ford, III, Poughkeepsie, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 11/532,294

(22) Filed: Sep. 15, 2006

(65) Prior Publication Data

US 2008/0071964 A1 Mar. 20, 2008

(51) Int. Cl.
*G06F 11/00* (2006.01)

(52) U.S. Cl. .................. 714/766; 714/763; 711/170; 711/164

(58) Field of Classification Search .......... 711/105, 711/154, 162, 164, 170; 714/718, 763, 766
See application file for complete search history.

(56) References Cited

U.S. PATENT DOCUMENTS

| | | | | |
|---|---|---|---|---|
| 5,163,096 A | * | 11/1992 | Clark et al. ............... | 711/164 |
| 5,644,541 A | * | 7/1997 | Siu et al. .................. | 365/200 |
| 5,787,309 A | | 7/1998 | Greenstein et al. .......... | 395/856 |
| 6,035,381 A | | 3/2000 | Mita et al. .................. | 711/164 |
| 6,330,557 B1 | * | 12/2001 | Chauhan ..................... | 707/3 |
| 6,883,077 B2 | | 4/2005 | Kimura et al. ............... | 711/164 |
| 6,950,345 B1 | | 9/2005 | Tokiwa ................... | 365/185.22 |
| 2003/0200406 A1 | | 10/2003 | Kouno ....................... | 711/164 |
| 2004/0205433 A1 | | 10/2004 | Gower et al. ................ | 714/733 |
| 2005/0044459 A1 | * | 2/2005 | Scheuerlein et al. ......... | 714/719 |
| 2005/0262341 A1 | | 11/2005 | Field .......................... | 713/165 |
| 2008/0072109 A1 | * | 3/2008 | Swietek et al. .............. | 714/718 |

* cited by examiner

*Primary Examiner*—Hong Kim
(74) *Attorney, Agent, or Firm*—Lynn L. Augspurger; Roy W. Truelson

(57) ABSTRACT

Storage protection keys and system data share the same physical storage. The key region is dynamically relocatable by firmware. A Configuration Array is used to map the absolute address of the key region in to its physical address. The absolute address of keys can be fixed even though the physical location of the keys is relocated into a different region. A triple-detect double correct ECC scheme is used to protect keys. The ECC scheme is different from regular data in the storage and can be used to detect illegal access. Extra firmware and hardware is also designed to restrain customer's applications from directly accessing keys. With the key region being relocatable, the firmware could move the key region away from a known faulty area in a memory to improve system RAS. We also achieved the commonality objective that key memory device can use the same memory devices with other server systems that do not use keys.

19 Claims, 2 Drawing Sheets

RELOCATABLE STORAGE PROTECT KEYS FOR SYSTEM MAIN MEMORY

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety:

U.S. patent application Ser. No. 11/532,267, filed on Sep. 15, 2006, and entitled "Processor Memory Affay Having Memory Macros for Relocatable Storage Protect Keys", now U.S. Pat. No. 7,590,899 issued Sep. 15, 2009.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Per our z-series architecture, there exists a logical SP Key for every 4 KB of storage. Each SP key has 7 bits in length. An operation system manages system data access via these Keys. For example, in a system with 512 GB of Main Memory, needs 512 GB divided by 4 KB per SP Key which yields 128-million SP Keys. In prior machines, these Keys were packaged into separate SRAM or DRAM DIMMs. (FIG. 1)

References that discuss store/access system data and keys also show system data and keys in a separate physical storage. Further in these references, the key regions are not relocatable and their sizes are not changeable. For example, U.S. Pat. No. 6,035,381 by Mita, Kimiko, et al, shows separate entities used to store key and system data. Their key address space is not dynamically relocatable because it shares part of system data address line. U.S. Pat. No. 5,787,309, by Greenstein, Paul Gregory, et al, expresses an idea to protect key storage blocks in system virtual memory, but it does not address how the key and system data are in physical storage. U.S. Pat. No. 6,883,077, of Kimura, Hiroaki, et al, implies that a separate storage was used for keys.

SUMMARY OF THE INVENTION

The shortcomings of the prior art are overcome and additional advantages are provided through the provision of a configuration that stores data and storage protection keys in the same physical storage. The key region can be configured dynamically so its start location and size can be altered according to system needs. The SP keys have different and stronger ECC protection to improve RAS. Commonality of memory subsystems with other server systems that do not use keys is achieved as well.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the invention, technically we have achieved a solution which improves Reliability, Availability and Serviceability (RAS), achieves design commonality and cost/performance objective, provides great flexibility in SP keys/data design.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
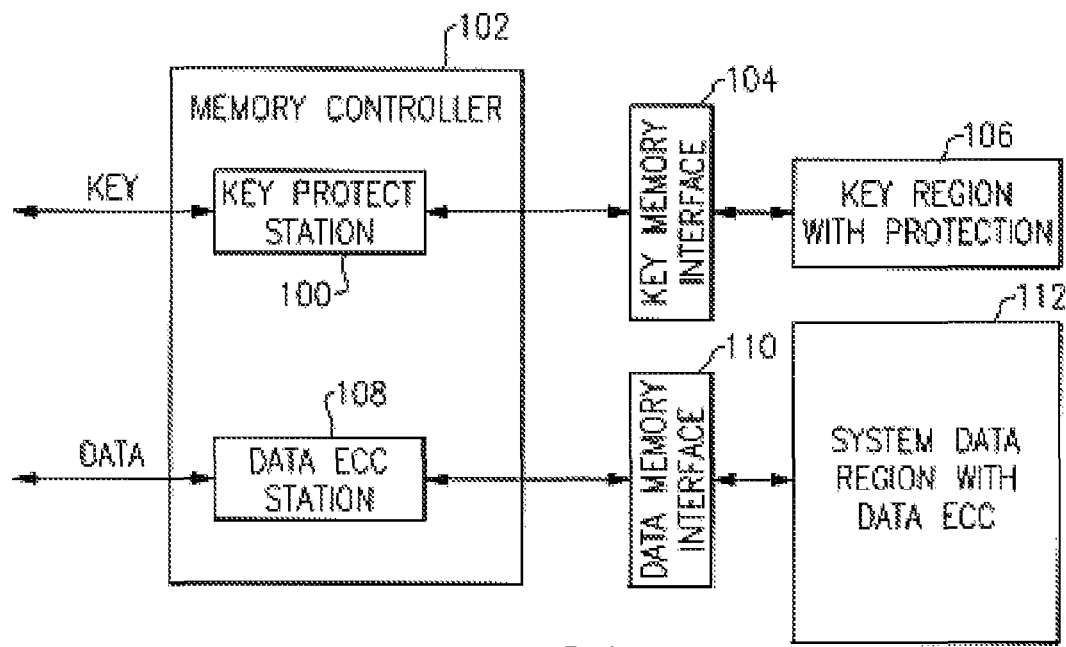
FIG. 1 illustrates a prior art arrangement with a fixed and separated key region.

In the prior art arrangement of FIG. 1, SP data are entered from a key protect station 100 in the memory controller 102 through a dedicated key memory interface 104 into a separate key storage region from the data protected by the SP data. The protected data are entered from a data ECC station 108 in the memory controller 102 through this data memory interface 110 into the system data region 112 containing data with Data ECC.

As opposed to the above described separated fixed/non-moveable memory physical location, to SP data in accordance with the present invention firmware can allocate any region within the physical storage to Storage Protection keys by using a configuration array which maps absolute addresses into physical addresses. This special SP key region is fully configurable, that can be allocated in any area within physical storage and can vary in size depending on the size of system main memory.

Figure 2:
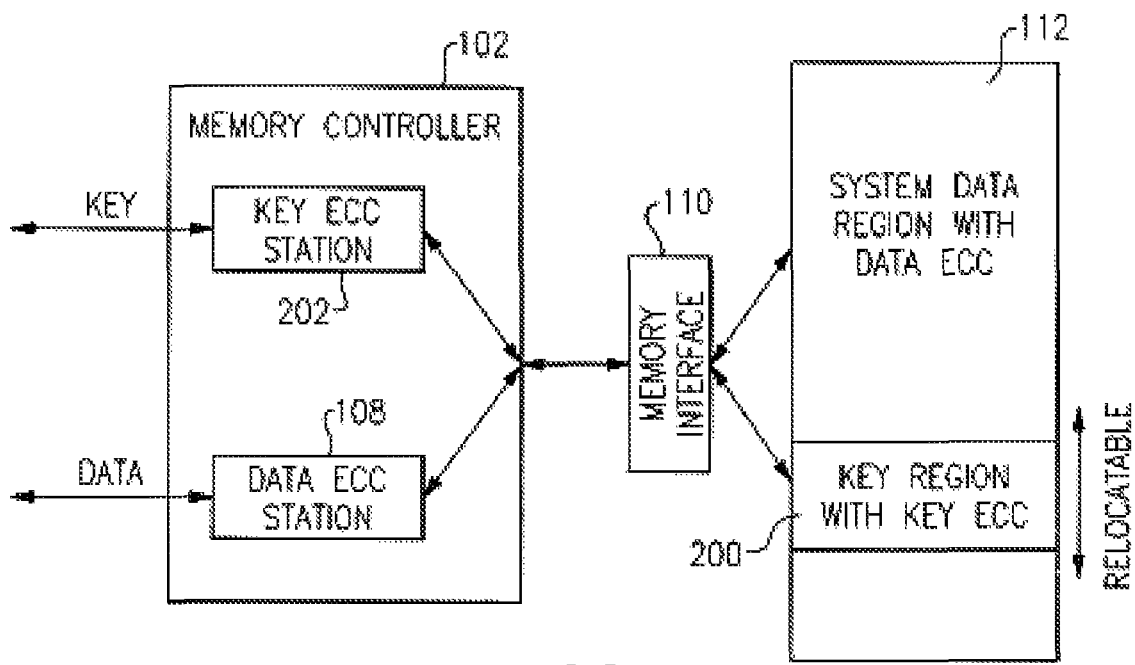
FIG. 2 illustrates the invention of relocatable key region within the physical storage.

As shown in FIG. 2 a movable Key Region 200 with SP Key data and SP data ECC is contained in the same physical memory space 112 as the data it protects. The SP data and SP data ECC are also entered and accessible through the same memory interface 110 as the protected data. The SP data and the SP data ECC are provided from a key ECC station 202 in the memory controller.

Figure 4:
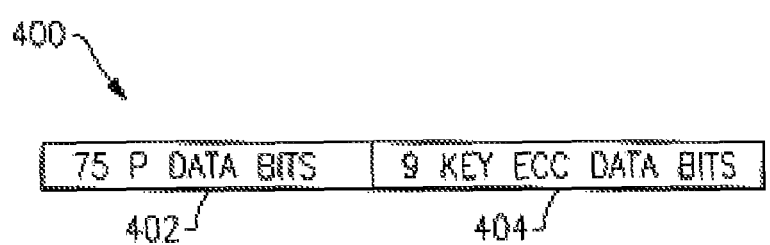
FIG. 4 illustrates a key data bit pattern.

In a computer system, key fails are in general more critical than system data failures. For this reason SP keys in the key region are protected by a different ECC scheme than the regular system data in the rest of the physical storage. In z9-109 server system, the SP key ECC uses triple detect and double correct matrix as compared to parity protection used in prior designs. As shown in FIG. 4 each physical key consists of 7 bits of data 402 and 9 bits of ECC bits of data. The key ECC code is different from the ECC code protecting the system data which resides in the rest of the physical storage. If a misbehaved operation tries to read SP keys with a regular data-read command, the ECC station 202 in the memory controller will flag an error and the SP keys will not be returned back to the requester.

With this invention, commonality is achieved with computer systems that do not have SP Keys. In the prior designs, separate DIMMs were dedicated to hold keys. The memory components that can hold keys were not compatible with generic memory design. With the key storage method introduced above, systems that do not require keys can share the same type of memory components as those that do.

System RAS is also enhanced by this design. In prior design, any failure in the key DIMM portion of memory subsystem disables the entire memory subsystem. With the new method, the key region can be relocated into a new region, if the region that holds keys have excessive error rate. The bad region can then be marked as unavailable so it will not be used again.

In the configuration of FIG. 2 where part of the physical storage memory is used to store keys, the starting address and the size of this area can be programmed by firmware. While SP keys and system data are accessed through the same memory interface, the memory controller will handle the key data differently from the system data because key data has a different a ECC protection arrangement than the system data.

Figure 3:
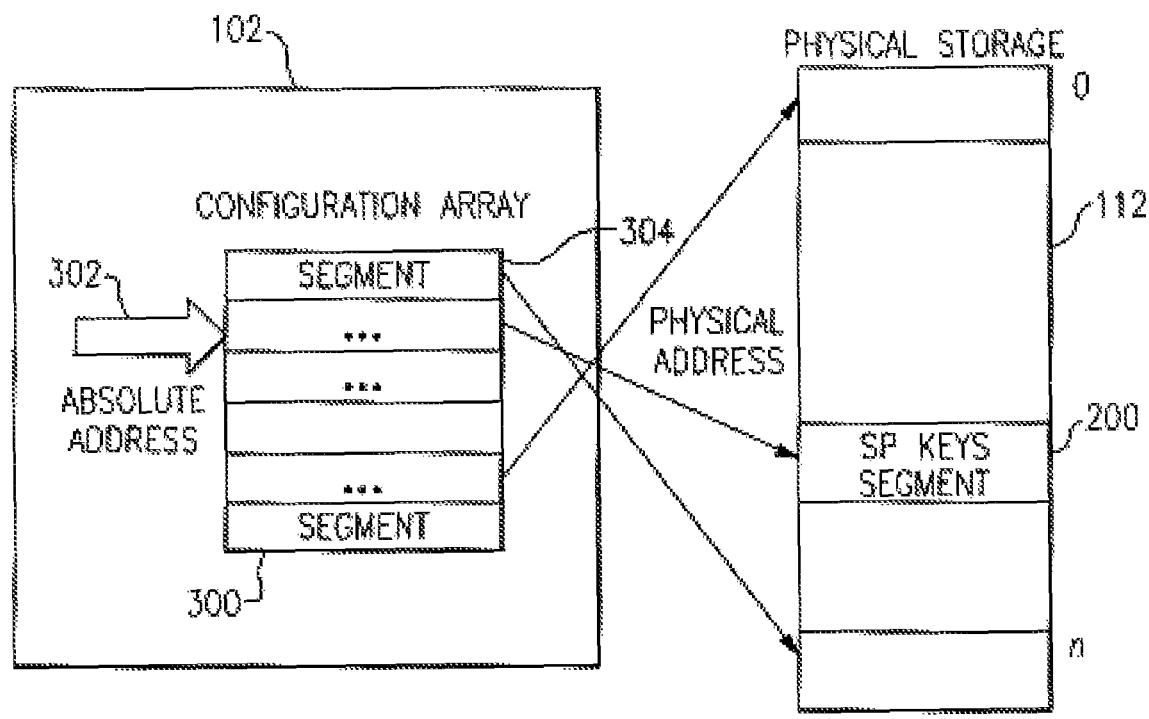
FIG. 3 illustrates one example of address mapping of the key region from absolute address to physical address.

In FIG. 3 illustrates how address mapping of the SP key region from absolute address to physical address can be performed using a configuration array 300. With the illustrated arrangement each segment in absolute address space 302 can be mapped into a segment in physical address space 304. With this mapping capability, the absolute address of the key region is fixed while the physical address of the key region can be changed to make the key region relocatable in any desired address o to n in physical storage.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of integrating storage protection (SP) key data for protecting memory with the memory data it protects, comprising the steps of:
providing a plurality of like physical storage segments for storing both the memory data and the storage protection (SP) key data in a main memory storage of a memory subsystem, each said physical storage segment capable of storing any one of: (a) SP key data including a plurality of storage protection keys; and (b) memory data protected by a respective said storage protection key;
assigning absolute addresses to the SP key data; and
providing a changeable physical SP Key region in a subset of said plurality of like physical storage segments by using physical addresses mapped from the absolute addresses so that the physical addresses of SP key data can be changed with main memory storage reconfigurations, said subset containing at least some and fewer than all said plurality of like physical storage segments, each segment of said subset for storing SP key data including a plurality of storage protection keys, each storage protection key protecting respective memory data in a respective physical storage segment of said plurality of physical storage segments not contained in said subset, wherein each of a plurality of said physical storage segments not contained in said subset is for storing respective said memory data protected by a respective said storage protection key.

2. The method according to claim 1, wherein said step of assigning the physical SP Key region uses a Storage Controller configuration array which maps absolute addresses for said SP Key region into the physical addresses.

3. The method according to claim 1 wherein said step of assigning is accomplished by using firmware to assign the SP Key region anywhere within said main memory storage.

4. The method according to claim 1 wherein said step of assigning is accomplished by executing firmware to assign the SP Key region to relocate the SP Key region in said main memory storage from another storage region.

5. The method according to claim 4 wherein said step of assigning the SP Key region to a relocated storage region for SP Keys occurs after there has been excessive DRAM errors identified in the original said SP Key region of said main memory storage.

6. The method according to claim 5 wherein said relocation of a storage region for SP Keys occurs after said excessive DRAM errors are identified in the original said SP Key region of said main memory storage during IML startup testing of said memory subsystem.

7. The method according to claim 1 wherein said SP Key region can be physically moved to a different main memory storage location along with integrated SP Keys of said SP Key region.

8. The method according to claim 1 wherein said main memory storage employs DDR SDRAMs and said memory subsystem provides a common interface through a main storage controller to said main memory storage for both data and SP Keys, and during startup a memory selftest runs against the entire main memory storage of said memory subsystem to report possible errors found in testing of all memory storage elements in said main memory storage which includes SP Key regions.

9. The method according to claim 8 wherein said step of assigning a physical SP Key region uses an Storage Controller configuration array which maps absolute addresses for said SP Key region into the physical addresses, and wherein the main storage controller and a key cache controller have programmable addresses within main storage which identify a relocatable physical segment that is reserved as a relocatable SP Key region for said assigning step.

10. The method according to claim 9 wherein said step of assigning is accomplished by executing firmware to assign the SP Key region to a relocatable physical address for the SP Key region in said main memory storage from another storage region after there has been excessive DRAM errors identified in the original said SP Key region of said main memory storage, and during IML startup testing of said memory subsystem said SP Key region is physically moved to a different main memory storage along with integrated SP Keys of said SP Key region to relocate the SP Key region in said main memory storage.

11. A memory where storage protection (SP) key data is to be stored with the memory data protected by the SP key data, comprising:

a plurality of like physical storage segments for storing both the main memory data and the storage protection (SP) key data together in a main memory storage of a memory subsystem, each said physical storage segment capable of storing any one of: (a) SP key data including a plurality of storage protection keys; and (B) memory data protected by a respective said storage protection key;

apparatus for providing the SP key data with absolute addresses; and firmware for mapping physical addresses in said main memory storage from said absolute addresses, said firmware providing a relocatable physical SP Key region in said main memory storage, said physical SP Key region occupying a subset of said plurality of like physical storage segments by mapping the physical address from the absolute address, said subset containing at least some and fewer than all said plurality of like physical storage segments, each segment of said subset for storing SP key data including a plurality of storage protection keys, each storage protection key protecting respective memory data in a respective physical storage segment of said plurality of physical storage segments not contained in said subset, wherein each of a plurality of said physical storage segments not contained in said subset is for storing respective said memory data protected by a respective said storage protection key.

12. The memory according to claim 11, wherein said firmware uses a Storage Controller configuration array which maps the absolute address for said SP Key region into the physical address.

13. The memory according to claim 11 wherein the firmware is capable of placing the SP Key region anywhere within said memory storage.

14. The memory according to claim 11 wherein said SP Key region can be physically moved to a different main memory storage along with integrated SP Keys of said SP Key region.

15. The memory according to claim 11 wherein said main memory storage employs DDR SDRAMs and said memory subsystem provides a common interface through a main storage controller to said main memory storage for both data and SP Keys, and during startup a memory selftest runs against the entire memory storage of said memory subsystem to report possible errors found in testing of all memory storage elements in said main memory storage which includes SP Key regions.

16. The memory of claim 12 further comprising, a plurality of DRAMs for providing said memory elements and a register buffer for said DRAMs, said register buffer providing ECC protection for the contents of said DRAMs and their memory elements.

17. The memory of claim 11 including ECC protection for SP Keys stored in the SP key region of said main memory storage which is different from ECC protection for the main memory data.

18. The memory of claim 16 wherein said register buffer provides a triple detect and double correct ECC matrix for SP Keys in said main memory storage.

19. The memory of claim 18 wherein a DIM memory module provides said plurality of DRAMs and a register buffer for the memory module for buffering data and SP Keys for said DRAMs and for performing ECC checking of said data and SP Keys.

* * * * *